United States Patent [19]

Bettman

[11] Patent Number: 4,613,972
[45] Date of Patent: Sep. 23, 1986

[54] RESONANT CAVITY STRUCTURE FOR ION LASER WITH FLOATING PLATE FOR MIRROR ADJUSTMENT

[75] Inventor: Ralph B. Bettman, Mountain View, Calif.

[73] Assignee: Spectra-Physics, Inc., San Jose, Calif.

[21] Appl. No.: 608,603

[22] Filed: May 9, 1984

[51] Int. Cl.[4] ............................................. H01S 3/03
[52] U.S. Cl. ...................................... 372/107; 372/65
[58] Field of Search ..................... 378/65, 107, 55, 93, 378/108, 61

[56] References Cited

U.S. PATENT DOCUMENTS

| | | | |
|---|---|---|---|
| 3,864,029 | 2/1975 | Mohler | 372/107 |
| 3,883,820 | 5/1975 | Burns et al. | 372/107 |
| 4,371,969 | 2/1983 | Chicklis et al. | 372/92 |
| 4,442,524 | 4/1984 | Reeder et al. | 372/108 |
| 4,464,763 | 8/1984 | Mohler | 372/108 |

*Primary Examiner*—Leon Scott, Jr.
*Attorney, Agent, or Firm*—Donald C. Feix; Paul Davis

[57] ABSTRACT

A floating mirror plate for a laser is suspended in a resonant cavity structure by graphite fiber rods. The cavity structure positions the mirror mounting plates and maintains a highly stable longitudinal spacing of the mirror mounting plates, despite thermal expansion and contraction of other parts of the cavity structure during operation of the laser. The graphite rods are associated with metal tubes and metal bracket support plates for resisting torsion by a construction which does not clamp the metal tubes onto the graphite rods. This construction permits relative movement, in a longitudinal direction, between the metal tubes and the graphite rods to accommodate thermal expansion and contraction of the metal tubes occurring during operation of the laser. The floating plate structure also embodies a rod arrangement in which the rods are not required to be aligned with contact pads for mirror adjusting screws.

7 Claims, 4 Drawing Figures

RESONANT CAVITY STRUCTURE FOR ION LASER WITH FLOATING PLATE FOR MIRROR ADJUSTMENT

BACKGROUND OF THE INVENTION

This invention relates to a resonant cavity structure for an ion laser.

This invention relates particularly to a resonant cavity structure (a) which separates the functions of (1) longitudinal positioning of the mirror mounting plates and (2) rotation and/or lateral shifting of the mirror mounting plates, and (b) which utilizes specific materials best suited for accomplishing each of these separate functions and (c) which decouples the geometry of the cavity structure from the location of the contact points for the mirror adjusting screws.

Ion lasers, such as, for example, Argon and Krypton ion lasers, are often used to provide single mode operation so that the laser operates at a truly single frequency. Operation in a single longitudinal mode at a truly single frequency is highly important for applications such as holography, laser doppler velocimetry, and other applications which depend on having a truly single color laser.

Because of the nature of the modes that can be produced under the gain curve of an ion laser, any change in the overall length of the cavity can create problems in maintaining a truly single frequency. To prevent such problems, the distance between the end mirrors has to be made extremely stable with respect to both temperature and vibration. A resonator structure is a basic and important part of the laser cavity, because the resonator structure provides the mirror mounting plates for the cavity.

The prior art techniques for holding the mirror plates stable have not been entirely satisfactory.

SUMMARY OF THE PRESENT INVENTION

It is a primary object of the present invention to hold the mirror mounting plates in a highly stable location and spacing by apparatus and techniques which avoid the problems presented by the prior art.

It is an important object to separate the functions of length stability and lateral stiffness and to use different, specific materials which are best suited to provide each function.

In a specific embodiment of the present invention, the resonant cavity apparatus for a laser has two mirror mounting plates for mounting the mirror mounting plates which define the cavity length. The mirror mounting plates are held in a highly stable spacing by graphite fiber rods which have substantially zero coefficient of thermal expansion.

The resonant cavity apparatus has metal tube and plate structure associated with the graphite rods for preventing rotation and lateral and angular displacement of the mirror mounting plates while maintaining the highly stable spacing. One end of the metal tube and plate structure can move relative to one of the mirror mounting plates (the floating plate), to accommodate thermal expansion and contraction of the metal tube and plate structure without changing the longitudinal spacing between the two mirror mounting plates.

A leaf spring arrangement is connected between the floating mirror mounting plate and a related metal end bracket plate of the tube and plate structure to permit the relative longitudinal movement described immediately above. The spring arrangement, however, prevents any rotation or lateral displacement of the floating mirror mounting plate with respect to the related metal end bracket plate.

Another object is to decouple the geometry of the metal tube and plate structure from the locations of the contact points for the mirror adjusting screws.

There are three graphite rods and three related metal tubes, and these rods and tubes are arranged in a configuration which is not orthogonal, as viewed end on, but more nearly approaches an equilateral triangle. This provides increased stiffness for resistance to vibration, and also provides resistance to bending of the resonant cavity apparatus.

The hardened pads which serve as the bearing points/or the mirror adjusting screws are not required to be aligned with the ends of the tubes.

The present invention permits the length stability and lateral stiffness to be obtained without the necessity to clamp the metal tube and plate structure onto the graphite rods.

The present invention provides a simplified resonant cavity apparatus construction which is effective to provide the desired stability of location and spacing of the mirror mounting plates.

Resonant cavity apparatus and methods which incorporate the features noted above and which are effective to function as described above comprise further objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

In FIG. 1 some parts of the structure have also been broken away and are illustrated in cross section to show features of the construction.

FIG. 2 is taken generally along the line and in the direction indicated by the arrows 2—2 in FIG. 1.

DESCRIPTION OF THE PREFERRED EMBODIMENTS

Figure 1:
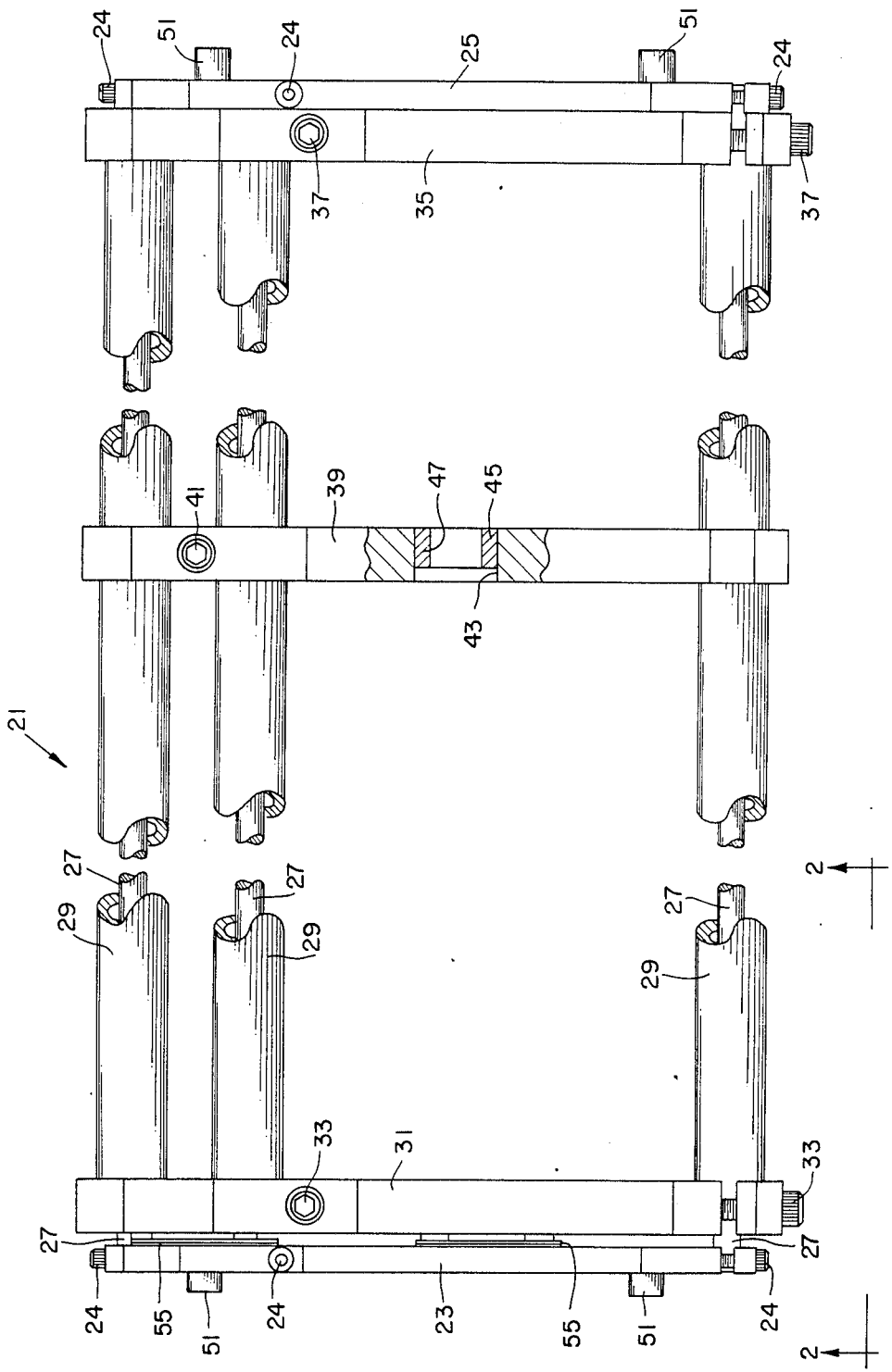
FIG. 1 is a top plan view of a resonant cavity apparatus constructed in accorandance with one embodiment of the present invention. A central part of the cavity apparatus has been deleted in FIG. 1, as indicated by the wavy lines, to reduce the overall length of the drawing view.
Figure 2:
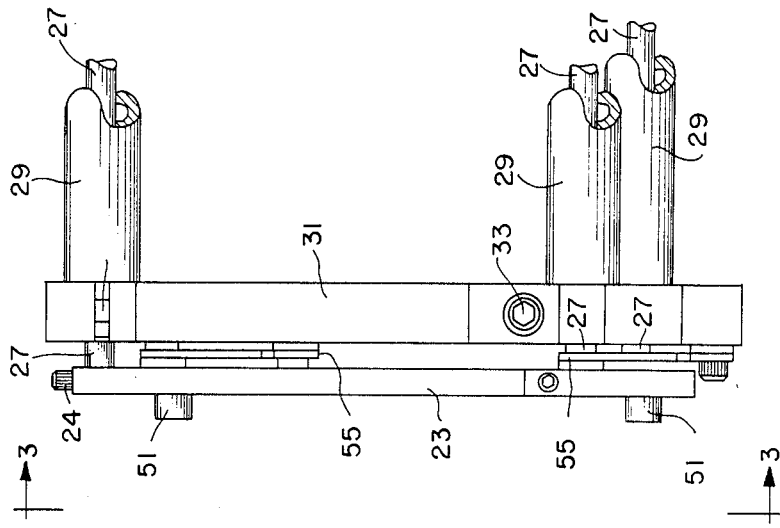
FIG. 2 is an end elevation view of the left hand end of the cavity apparatus shown in FIG. 1.

A resonant cavity apparatus constructed in accordance with one embodiment of the present invention is indicated generally by the reference numeral 21 in FIG. 1.

To simplify the showing of the principles of this invention the resonant cavity apparatus 21 has been shown without a related laser tube, power supply, or other accessories. As will become more apparent from the description to follow, the laser tube is held in position relative to the cavity apparatus 21 within the central openings 47 in related bushings 45 shown in FIG. 1, and the end mirrors (not shown) of the laser resonant cavity are mounted on and held in position by mirror mounting plates 23 and 25.

The resonant cavity apparatus 21 includes a first mirror mounting plate 23 for mounting a mirror at one end of the cavity and a plate 25 for mounting a mirror at the other end of the cavity.

The mirror mounting plates 23 and 25 are held at a highly stable longitudinal distance apart from one another by three graphite fiber rods 27, as will be explained in more detail below.

The mirror mounting plates 23 and 25 are attached to the graphite rods 27 by cap screws 24 and the related slotted construction (see FIG. 3) of the plates 23 and 25.

A hollow steel tube 29 is concentric with each graphite rod 27 along almost the entire length of the related graphite rod. The interior diameter of the steel tube 29 is larger than the outside diameter of the graphite rod 27 so that the steel tube does not touch the related graphite rod.

An end resonator bracket plate 31 is clamped, by cap screws 33 and a similar slotting arrangement, onto the ends of the metal tube 29 at the end of the resonant cavity apparatus adjacent the mirror mounting plate 23.

Figure 3:
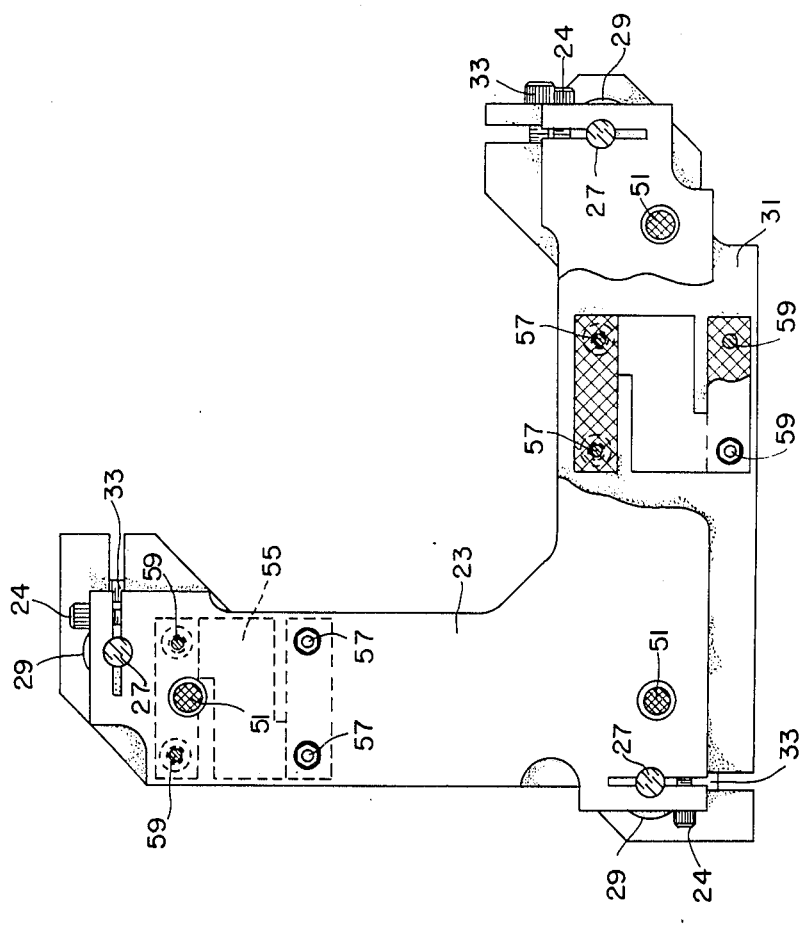
FIG. 3 is an end elevation view taken along the line and in the direction indicated by the arrows 3—3 in FIG. 2. Parts of FIG. 3 have been broken away to illustrate details of construction.

As best illustrated in FIG. 3, the end resonator bracket plate 31 has somewhat of a C-shaped configuration, as viewed end on.

A second end resonator bracket plate 35 is connected to the other ends of the steel tubes 29 by cap screws 37 at the end of the resonant cavity apparatus adjacent the mirror mounting plate 25. The plate 35 has a configuration which is identical to the plate 31 shown in FIG. 3.

A number of support resonator bracket plates 39 are connected to the metal tubes 29 by cap screws 41 at points along the length of the tubes 29. Only one plate 39 is shown in FIG. 1.

In a specific embodiment of the present invention the plates 39 are rectangular shaped plates, as viewed end on, and have central apertures and bushings for supporting the resonator in place within the central openings of the bushings. Only aperture 43, bushing 45, and opening 47 are shown in FIG. 1.

Three hardened pads 51 at each end of the resonant cavity apparatus 21 constitute a bearing surface for kinematically positioning the mirror with a related mirror adjusting plate.

The mirror mounting plate 25 is, in a specific embodiment of the present invention, anchored with respect to the plate 35 during operation of the laser.

It is an important feature of the present invention that the end resonator bracket support plate 31 can move in a longitudinal direction with respect to the mirror mounting plate 23 during operation of the laser. The mirror mounting plate 23 is supported with respect to the plate 31 so that thermal expansion and contraction of the steel tubes 29, resulting from temperature variations encountered in operation of the laser, do not change the longitudinal spacing of the mirror mounting plates 23 and 25. Instead, the graphite rods 27, which have substantially zero coefficient of thermal expansion, hold the plates 23 and 25 at a highly stable distance apart.

The steel tubes 29 and related plates 31, 35 and 39 play no part in determining the longitudinal spacing between the mirror mounting plates 23 and 25. The steel tubes 29 and related plates 31, 35 and 39 do, however, play a very important part in preventing rotation and/or lateral shifting (see FIG. 4) of the mirror mounting plates 23 and 25. The steel tubes 29 and plates 31, 35 and 39 are highly resistant to torsion, and the braced structure presented by the steel tubes 29 and related plates 31, 35 and 39 provides a quite stiff construction.

It should be noted that the steel tubes could be replaced by other structural numbers, such as extrusions.

As noted above, the mirror mounting plate 25 is anchored with respect to the related end resonator bracket plate 35 in the embodiment shown in the drawings; so the mirror mounting plate 25 does not rotate or shift laterally in any direction with respect to the plate 35.

As best illustrated in FIG. 3, the mirror mounting plate 23 is associated with the related end resonator bracket plate 31 by leaf springs 55.

Each leaf spring 55 is a Z-shaped member having one end and a related spacer connected to the mirror mounting plate 23 by cap screws 57 and having another end and a related spacer connected to the plate 31 by cap screws 59.

The leaf springs 55 serve as resilient spacers between the plates 23 and 31 for permitting longitudinal movement of the plate 31 with respect to the plate 23 while preventing relative rotation or relative lateral shifting of plate 23 with respect to plate 31.

While leaf springs 55 are shown in the specific embodiment illustrated in the drawings, other means, such as bearings, can be used in place of the leaf springs.

The plate 23 thus has its longitudinal position determined solely by the graphite rods 27 but obtains the benefit of the torsional stiffness of the plate 31 and tubes 29 through the interconnection provided by the leaf springs 55.

Figure 4:
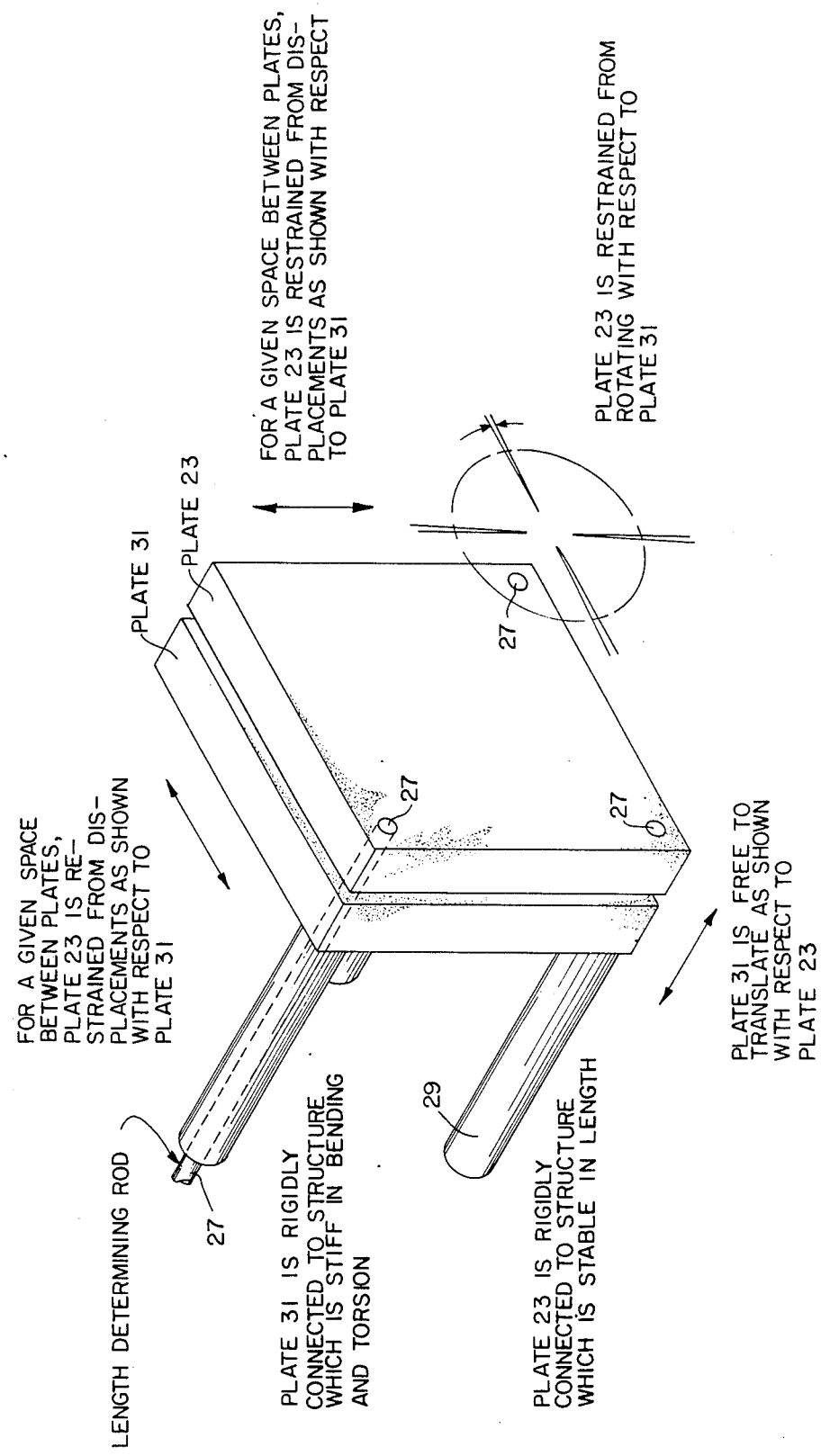
FIG. 4 is a diagrammatic, isometric view, with legends, illustrating the principles of the floating plate construction of the present invention.

The way in which the present invention separates the functions of the longitudinal positioning and resistance to rotation and/or lateral displacement is best illustrated in FIG. 4 (and by the legends associated with the respective plates 23 and 31 in that FIG. 4).

It is another important feature of the present invention that the rods 27 (and associated tubes 29) do not have to be in line with the bearing points for mirror adjusting plates. Instead, these rods can be associated in an arrangement which is more desirable for structural considerations.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A resonant cavity apparatus for a laser of the kind having a mirror at each end of the cavity, said resonant cavity apparatus comprising,
    a first mirror mounting plate,
    a second mirror mounting plate,
    structure means for holding the first mirror mounting plate in fixed position at one end of the cavity, said structure means having a far end positioned adjacent the second mirror mounting plate, graphite rod means connected in fixed relationship to the first mirror mounting plate and extending through the structure means and having ends connected in fixed relationship to the second mirror mounting plate and being continuous from the first mirror mounting plate to the second mirror mounting plate, for holding the first and second mirror mounting plates a highly stable longitudinal distance apart over the range of temperature variation encountered in operation of the laser, and wherein the far end of the structure means is movable with temperature variation in a longitudinal direction with respect to the mirror mounting plates and with respect to the graphite rod means, and connector means for connecting the second mirror mounting plate to the far end of the structure means so as to permit said relative longitudinal movement of the far end with respect to the second mirror mounting plate while preventing any rotational or lateral movement of the second mirror mounting plate with respect to said far end of the structure means.

2. The invention defined in claim 1 wherein the graphite rod means include three graphite rods and wherein the structure means include a steel tube encircling each graphite rod in non contacting arrangement so that the steel tube is free to expand and contract in a longitudinal direction with respect to its associated graphite rod.

3. The invention defined in claim 2 wherein the structure means include a first end resonator bracket plate associated with the first mirror mounting plate and a second end resonator bracket plate comprising a part of said far end and associated with the second mirror mounting plate and a plurality of support resonator bracket plates located at longitudinally spaced locations along the length of the steel tubes and wherein each of the resonator bracket plates is clamped to the steel tubes to provide a structure which has high strength for resisting twisting and bending of the resonant cavity apparatus about the longitudinal axis of the resonant cavity apparatus.

4. The invention defined in claim 3 wherein the connector means include leaf spring means interconnecting the second mirror mounting plate and the second end resonator bracket plate.

5. The invention defined in claim 2, wherein the three graphite rods and associated rigid tubes are arranged non-orthogonally, as viewed end on, approaching an equilateral triangle, for increased stiffness and resistance to vibration and to bending.

6. The invention defined in claim 1 wherein the connector means include leaf spring means interconnecting the second mirror mounting plate and said far end of the structure means.

7. A method of positioning end mirrors for a laser of the kind having a mirror at each end of a resonant cavity, said method comprising, holding the mirror mounting plates in a highly stable longitudinal spacing with graphite rods which have substantially zero coefficient of thermal expansion and which are contiuous from one mirror mounting plate to the other, holding the mirror mounting plates against rotation and lateral shifting by a metal tube, plate and spring construction, separate from the graphite rods, which permits the metal tube, plate, and spring construction to move longitudinally with respect to one of the mirror mounting plates, as with thermal expansion and contraction, without affecting the longitudinal position of that mirror mounting plate or the spacing between the mirror mounting plates.

* * * * *